United States Patent [19]
Haines

[11] 3,765,622
[45] Oct. 16, 1973

[54] AIRCRAFT CONTROL MEANS
[76] Inventor: Robert M. Haines, R.R. 7, Maize, Kans. 67205
[22] Filed: Jan. 17, 1972
[21] Appl. No.: 218,414

[52] U.S. Cl. ............................................ 244/17.11
[51] Int. Cl. ............................................. B64c 27/04
[58] Field of Search .................... 244/17.11, 17.25, 244/17.23, 17.19; 416/149, 150; 214/1 BB

[56]  References Cited
UNITED STATES PATENTS
2,551,455  5/1951  Neale ............................... 244/17.11
3,045,950  7/1962  Jennings, Jr. ..................... 244/17.11
2,563,047  8/1951  Kisner ............................ 244/17.11 X
3,563,499  2/1971  Dueweke ......................... 244/17.25 X Primary Examiner—Milton Buchler
Assistant Examiner—Paul E. Sauberer
Attorney—John H. Widdowson

[57]  ABSTRACT

A rotorcraft control has one carriage transversely translatably mounted on an aircraft frame, and another carriage longitudinally translatably mounted on the first carriage with a rotor blade drive apparatus mounted on the second carriage. Apparatus is provided to move the carriages independently and simultaneously so as to control the position of the blade rotating apparatus on the airframe.

3 Claims, 8 Drawing Figures

PATENTED OCT 16 1973 3,765,622

PATENTED OCT 16 1973　　3,765,622

AIRCRAFT CONTROL MEANS

Numerous types of control systems are known in the prior art as operable to control the rotor blade on a rotary wing type of aircraft. These prior art devices used to control rotorcraft blades fall into several general categories. One type of prior art device uses a fixed position rotor head with mechanical means to change the overall pitch of the rotor blades and to change the pitch of the rotor blades in a cyclic manner relative to the direction of motion of the aircraft. Another type of control device used with rotorcraft comprises an engine and a rotor head swingably mounted as on a gimbal so as to change the position of the rotor blade and the center of gravity of the aircraft. An additional type of rotorcraft control is simply a fixed pitch blade pivotally mounted so as to pivot in a plane transverse to the rotorcraft thereby controlling the lift effect of the rotor blade by changing its angle of attack in forward motion. One last type of rotorcraft blade control consists of a rotor head apparatus supported by a linkage apparatus to change the relative position and angle of the rotor head somewhat like the gimbal mount. In all of the described types of rotorcraft control systems they each have their specific disadvantages and shortcomings, but generally the disadvantages to these prior art devices is that they require a great deal of machinery and control apparatus to accomplish the result. These control systems also have the overall disadvantage of not providing a control system which will compensate for loading of such an aircraft outside of a very limited center of gravity range. The control systems in which the rotor head secured in an immovable position on the aircraft structure characteristically have the usable range of the center of gravity quite restricted since the rotorcraft will become unstable if operated when the center of gravity is not in the allowable range. The most popular of the prior art control devices is the first mentioned with both pitch and cyclic control for the rotor blade; this system has been refeined so as to provide good control, has the disadvantage of a great number of moving parts which must be replaced periodically at a great expense and this system has a disadvantage of creating a great degree of vibration due to the moving parts.

In one preferred specific embodiment of the rotorcraft control means of this invention, such includes a rotorcraft control system having a pair of carriages; the first of which is mounted on the rotorcraft's structural frame and adapted to move transverse thereto, and the second of the carriages is mounted on the first carriage and adapted to move longitudinally and it has the rotor head assembly mounted thereon. The control means of this preferred specific embodiment is adapted to move rotor head assembly in a planar motion relative to the airframe. The airframe basically includes a fuselage structure, an engine, a tail rotor, and the control means of this invention. The specific airframe structure disclosed herein is general in nature and is provided with the basic and essential elements necessary for operation of the aircraft with the control means of this invention. The carriage which is mounted with the airframe has ways or beams mounted transverse to the normal direction of motion of the airframe and the carriage is adapted to move back and forth on these ways or beams when in use. The carriage which is mounted on the transversely movable carriable has the rotor assembly mounted on it and is connected to the transversely movable carriage by a similar arrangement of ways or beams. A cable control apparatus is connected to the longitudinally movable carriage and adapted to move it alone forward and rearward relative to the airframe and to move both carriages back and forth or transversely on the airframe. The rotor head assembly includes a gear box mounted on the longitudinally movable carriage with a rotor blade supported above it. The rotor head assembly is connected to the engine by a pivotable and extendable drive shaft.

In another preferred specific embodiment of the rotorcraft control means of this invention, the carriages and control components of the first described preferred specific embodiment are mounted on additional ways or beams positioned longitudinally on the airframe and adapted to move both carriages forward or rearward as a unit. The forward and rearward movement of the entire control and carriage apparatus is provided by the longitudinally mounted ways so the relative position of both carriages on the airframe can be varied forward and aft in order to provide a large allowable center of gravity range thereby giving greater stability for the rotorcraft in extreme loading conditions.

One object of this invention is to provide a rotorcraft control means overcoming the aforementioned disadvantages of the prior art devices.

Still, one other object of this invention is to provide a rotorcraft control system having a structure with a rotor head which can be moved in planar motion relative to the aircraft frame.

Still one other object of this invention is to provide a rotorcraft control system having a carriage to move the rotor head longitudinally relative to the aircraft frame and another carriage to move the rotor head transverse to the aircraft frame cooperating in that movement to control the relative position of the rotor head on the airframe and thereby control the aircraft.

Yet, one other object of this invention is to provide a rotorcraft control system having a structure with one carriage mounted on the aircraft frame to move in a transverse direction and with another carriage mounted on the transversely movable carriage which will move longitudianlly relative to the airframe and have the rotor head assembly mounted on it.

Still antoher object of this invention in a second preferred specific embodiment is to provide a rotorcraft control means having a structure with a pair of carriages which can be moved longitudinally on the airframe to adjust the overall forward-aft position of the entire rotor head assembly in order to increase the allowable center of gravity range for a rotorcraft center of gravity.

Various other objects, advantages, and features of the invention will become apparent to those skilled in the art from the foregoing discussion, taken in conjunction with the accompanying drawings, in which.

Figure 1:
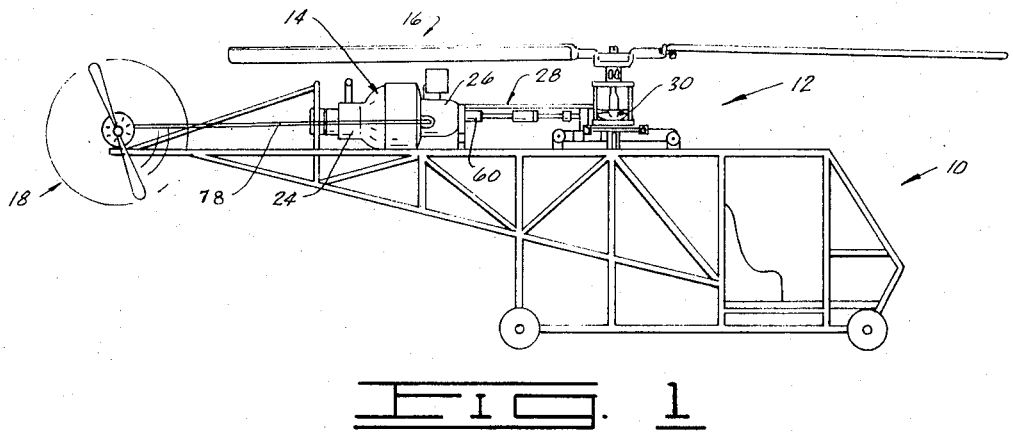
FIG. 1 is a side elevation view of a rotorcraft having the rotorcraft control means of this invention mounted thereon.

The following is a discussion and description of preferred specific embodiments of the aircraft control means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1. a rotorcraft is shown therein, indicated at 10; it is shown with a control system apparatus 12 of this invention mounted thereon connected to the engine 14 and rotor blade 16. The rotorcraft structure 10 includes an airframe on which the control apparatus 12, engine assembly 14, and a tail rotor 18 and other components necessary for the operation of a rotorcraft are mounted. The structure of the rotorcraft control apparatus 12 of this first described preferred specific embodiment is shown in detail in FIGS. 2, 3, 4, and 5. The control apparatus includes a first carriage 34 mounted so as to be transversely movable on a pair of beams, or ways 36 which are secured to the upper fuselage structure 38 of the rotorcraft, and a second carriage 40 mounted on longitudinally positioned beams 42 on the first carriage 34 so as to be movable longitudinally relative to the rotorcraft structure. In the description herein the transversely movable carriage 34 is referred to as the first carriage or the lower carriage and the longitudinally movable carriage 40 is referred to as the second carriage or upper carriage. The second carriage 40 has a cable control apparatus, indicated generally at 44, connected to it so as to move the second carriage 40 on the first carriage 34 in longitudinal movement and to move the first carriage 34 in a translating motion relative to the upper fuselage structure 38. The cable control apparatus is provided to control the motion of the rotor head apparatus in planar motion relative to the rotorcraft structure and is connected so that a pilot or other control device can be used in order to control motion of the rotorcraft 10 as will be described.

The control system 12 of this invention, utilizes a blade rotating apparatus specifically designed to continually rotate the rotor blade as the carriages move about during operation of the rotorcraft 10. The specific drive apparatus shown in the drawings illustrates one means of rotating the rotor blade in the required manner. The engine assembly 14 includes an engine 24 and transmission 26 which are permanently secured in place on the airframe and the drive shaft 28 is constructed to connect the transmission 26 to the gear box 30 as it moves with the upper carriage 40. The gear box 30 is secured to a platform 50 on the upper portion of the upper carriage 40 and has the fixed portion of the blade hub 52 supported above the gear box on a plurality of vertical support members 53. The rotor blade is driven by a shaft enclosed in a housing 54 connecting the gear box 30 to the rotor blade hub 56. The blades 58 are shown attached to the rototable blade hub 56 in a fixed angular position. The fixed portion of the blade hub 52 must be rigidly secured to the platform 50 and second carriage 40 so that the blades 58 will move in a plane substantially parallel to that in which the carriages move.

Input to the gear box 30 is through the drive shaft 28 from the transmission 26. The drive shaft 28 has a universal joint connection 60 at the transmission and the shaft itself is composed of two segments 62 and 64 which are connected so as to operably change the overall length. One segment of the drive shaft 62 is connected to the universal joint 60 at the transmission and the other segment of the drive shaft 64 is connected to the gear box 30 at a coupling indicated at 66. A drive shaft support bearing 68 is provided at the junction between the two segments 62 and 64 of the drive shaft and adapted to support the center portion of the shaft to reduce vibration and guide the drive shaf in its back and forth transverse motion as the carriages move. The drive shaft center support 68 has a fixed outer portion with a downwardly extending leg 69 having a roller 70 on its lower portion which rests on a roller guide 72. The roller guide 72 is a structural portion of the airframe that extends transverse to the drive shaft 28. The drive shaft center support 68 pivots about the universal joint 60 as the carriages move transversely and the roller moves in an arc at that time. When the carriages move longitudinally forward and aft, the inner portion of the drive shaft 64 slides into an out of the outer portion of the drive shaft 62. Immediately above the drive shaft is a pivotal guide arm assembly generally indicated at 73 consisting of a first arm 74 pivotally attached to the airframe structure to pivot transversely at the same transverse position as the drive shaft universal joint does, and a second arm 76 attached to the gear box coupling 66. The guide arm apparatus 73 is constructed so as to be extendable and retractable to move with the drive shaft 28 in its extending and retracting motion and to provide additional support and stability between the airframe and the carriages. The guide arm apparatus 73 and the drive shaft 28 are both constructed to be easily extendable and retractable when the rotorcraft is in operation.

It is to be noted also that the blade apparatus, gear box, drive shaft and other powering apparatus shown in the enclosed drawings has been proven, in practice, as sufficient to maintain operation of the rotorcraft. It is to be understood that other specific arrangements of blade apparatuses and driving apparatuses can be substituted so long as they fulfill a similar function in the invention. The specific rotor blade apparatus 16 shown and described herein is provided with fixed pitch blades 58; however, other rotor blade designs can be used which have variable pitch blades, or have blades that are controllable in their pitch during operation of the aircraft and including blade assemblies with counter-rotating blades. The rotor blade apparatus can be rotated by a fluid drive means separate from and mechanically connected to the blades or integrated into the blade structure.

The engine 24 and transmission 26 are securely mounted with the rotorcraft airframe and are connected to the gear box 30; they are also connected to the tail rotor 18. The manipulating controls for the engine, the carriages, and tail rotor 18 are not specifically shown in the drawings but are connected to the pilot's compartment of the rotorcraft so as to enable a pilot to control the function of these components for proper flight of the rotorcraft 10 or any other aircraft using the herein described invention. The tail rotor apparatus 18 is operated simultaneously with the other portion of the drive apparatus and is connected to transmission 26 by a drive shaft 78. Operation of the tail rotor apparatus is independently controllable from the motion of the rotor head apparatus in the control assembly.

The structural connection between the carriages 34 and 40 and the airframe structure are best seen in FIGS. 2, 3, 4, and 5. The lower carriage 34 is mounted directly to the airframe structure of the rotorcraft. The upper structural members of the rotorcraft airframe are indicated at 80 and have a support beam 82 connected thereto on which the first carriage ways are mounted. The upper airframe structure, indicated at 80, is attached to beam supports 82 by a pair of flanges 84 at opposite ends of the beam supports 82, as can be seen clearly in FIG. 2. The transverse ways or beams 36 are connected to the beam supports 82 in a position transverse relative to the rotorcraft's airframe. One of the transverse beams 86 is at the forward end of the beam support 82 and the other 88 at the aft end of the beam support 82. The lower or transversely movable carriage 34 is comprised of a pair of carriage blocks 90 connected between a pair of longitudinally oriented beams 92 and 94 rigidly connected between lower carriage blocks 90. For convenience in describing motion of the carriages the beam numbered 92 is on the right side of the airframe and the beam numbered 94 is shown on the left side of the airframe. The carriage blocks 90 each have an aperture therethrough adapted to engage the transverse beams 86 and 88.

Figure 2:
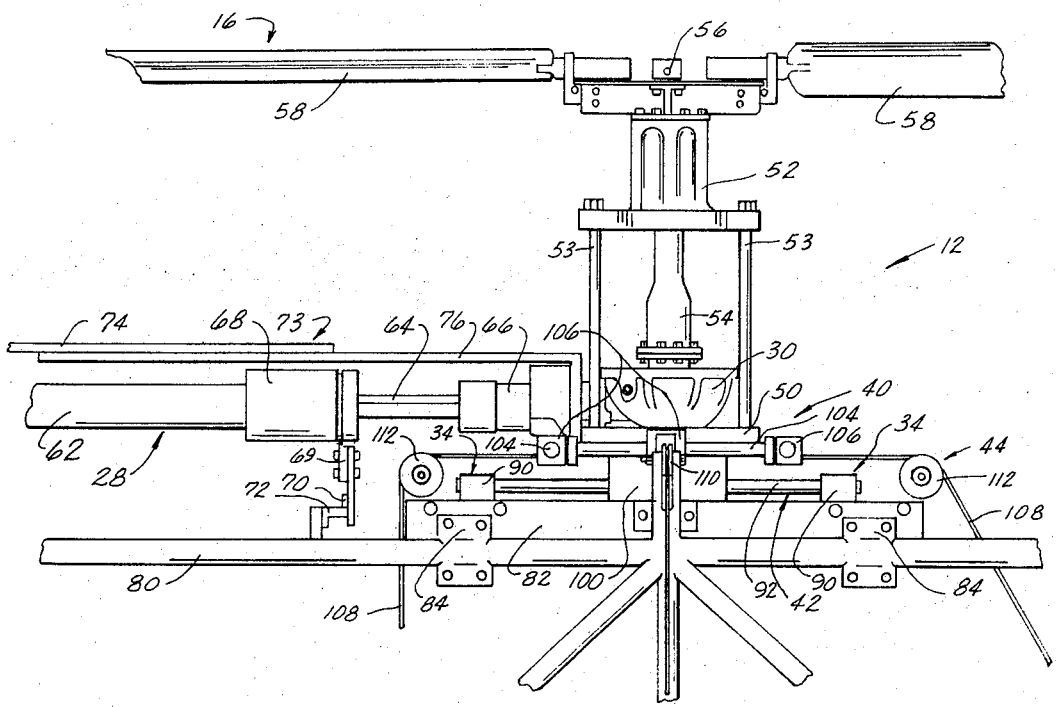
FIG. 2 is an enlarged side elevation view of a segment of the rotorcraft structure of FIG. 1, showing the rotor head assembly, a segment of the rotor blade, and the carriage apparatus.
Figure 3:
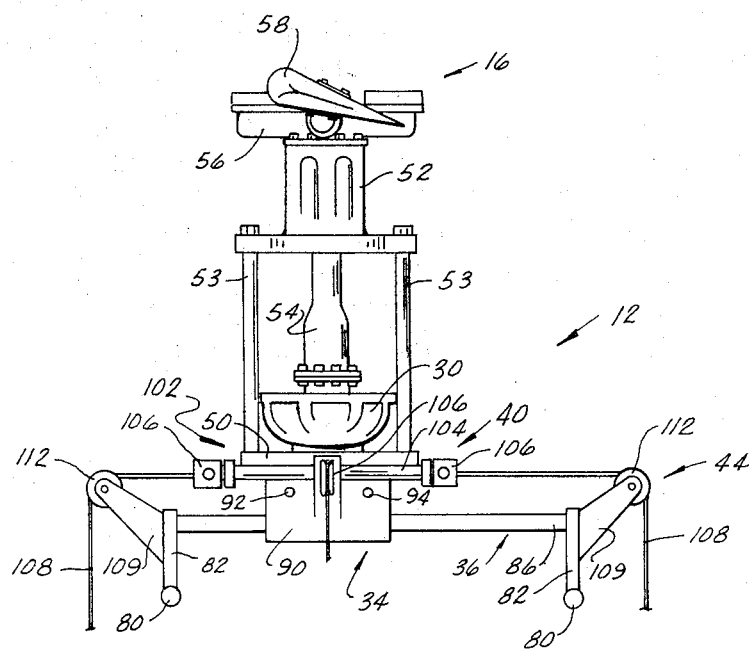
FIG. 3 is an enlarged front elevation view of a segment of the rotorcraft structure showing the control system apparatus and its attachment to the airframe.
Figure 4:
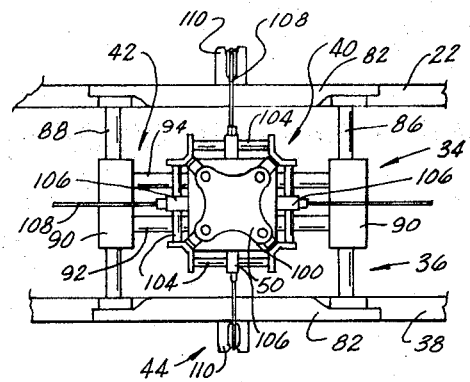
FIG. 4 is a top plan view of the carriage assembly without the rotor blade drive apparatus and having the carriages shown in the centered position.
Figure 5:
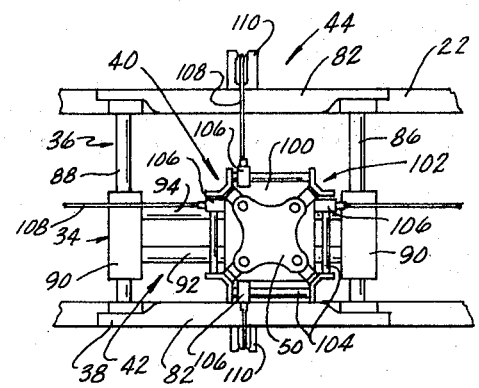
FIG. 5 is a top plan view of the carriage assembly without the rotor blade drive apparatus and shown with the transversely moving carriage in one extreme side position and the longitudinally moving carriage in its extreme position.

The upper carriage apparatus 40 has an upper carriage block 100 mounted with the longitudinal beams 92 and 94 as can be clearly seen in FIG. 2. A pair of passageways through the upper carriage block 100 are used to engage the longitudinal ways 92 and 94 to connect it to the structure and guide it in forward and aft motion. Both the upper carriage blcok 100 and the lower carriage blocks 90 preferably have ball bearing structures therein adapted to contact the ways to provide easy movement. The upper carriage block 100 has a guide bar apparatus indicated at 102 and the platform 50 on its upper portion. The platform 50 is the mounting surface for the gear box 30. A guide bar apparatus is used in conjunction with the control cable apparatus 44 to direct the carriages. The guide bar apparatus includes four guide bars indicated at 104 mounted on the four sides of the second carriage 40, as can be seen clearly in FIGS. and 5. Sliding blocks 106 are attached to the guide bar 104 and are connected to cable indicated at 108. The cables 108 pass over pulley fixtures 110 on the sides of the airframe and they pass over other pulley fixtures 112 on the forward and aft end portions of the carriage apparatus as can be seen in FIGS. 2 and 3. The four control cables 108 are a portion of the cable control apparatus 44 and are routed in the aircraft structure and connected to a control stick to be used by the pilot of the rotorcraft. The control cable apparatus 44 is designed so the control cables 108 are taut and the slight movement of the control stick will move the carriages 34 and 40. As a pilot moves the control stick, the cables 108 are moved correspondingly so as to pull the guide bar apparatus and upper carriage 40 thereby moving the upper carriage block 100 on the longitudinal beams 92 and 94, and also moving the lower carriage blocks 90 on the transverse beams 86 and 88. FIG. 4 shows both of the carriages 34 and 40 in the centered position. As the upper carriage 40 is moved forward on the longitudinal beams 92 and 94, the upper carriage block 100 slides nearer to the transverse beam 86; simultaneously, the sliding blocks 106 on the sides of the upper carriage 40 move along the guide beams 104 so the control ables are at all times in the same criss-cross intersecting relation. As the upper carriage is moved to one side or the other (as is shown in FIG. 5 where it is moved to he right), the upper carriage remains in a fixed position relative to the lower carriage 34 and the lower carraige 34 moves to the right on the transverse beams 86 and 88, while the sliding blocks 106 on the forward and aft portions of the upper carriage slide to the left end of their attached guide bars 104, so as to maintain the control cables in the intersecting position. Motion of the carriages anywhere within their range is done in the same general manner as described, only varying upon the motion and position to which the carriages are moved. It is to be noted, however, that the motion of the carriages need not be entirely in one direction and then in the other; the carriages can be moved in a straight line or diagonal fashion by simply moving the control stick in a diagonal manner so as to move the two carriages simultaneously.

It is to be noted that the use of the cable control apparatus 44 in moving the carriages is not to unduly restrict the scope of this invention and that such is provided only as a simple and easily operable and uncomplicated means of moving the carriages. In practice it has been found that the cable control apparatus as shown and described herein is sufficient to adequately control a rotorcraft having the control system of this invention.

Figure 6:
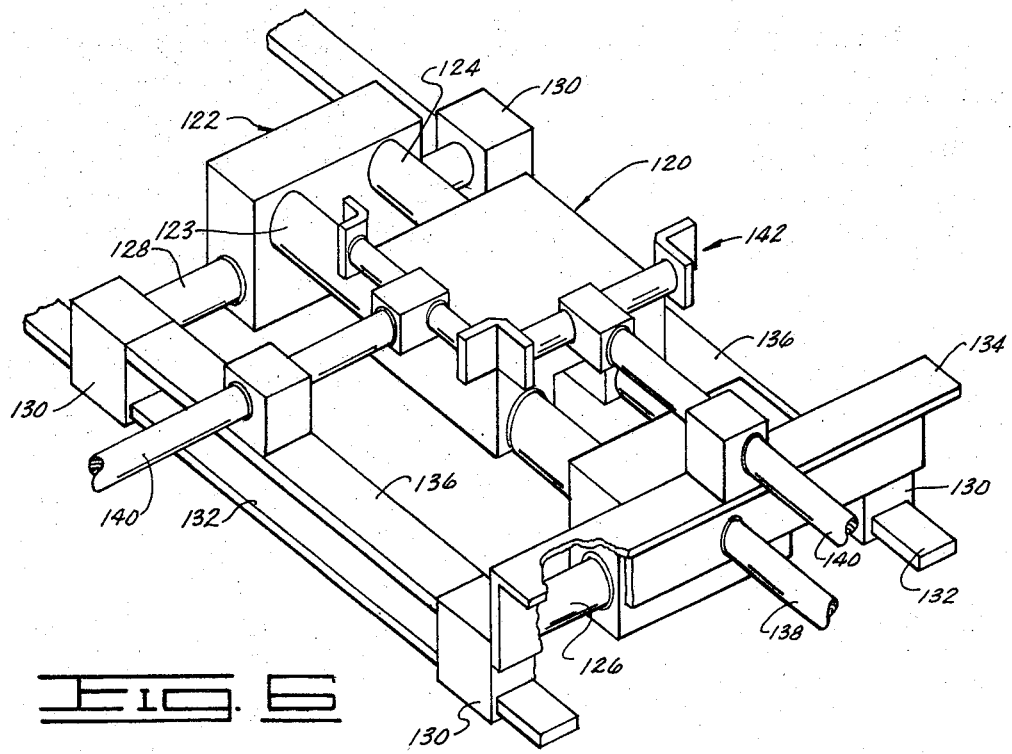
FIG. 6 is a perspective view of the second preferred specific embodiment of the control system carriage assembly having solid rod actuators and longitudinal overall position adjustment ways.

A second preferred specific embodiment of the herein described invention is shown in FIG. 6. The second preferred specific embodiment of the control means includes an upper carriage indicated at 120 and a lower carriage indicated at 122 which are mountable with an airframe structure so as to be movable in the entirety in a longitudinal or transverse manner. The upper carriage 120 is connected with the lower carriage 122 by a pair of beams or ways, indicated at 123 and 124. Similarly the lower carriage 122 has a pair of beams 126 and 128 passing therethrough and connected with four mounting blocks indicated at 130. The mounting block 130 attach the carriage apparatus to a pair of elongated beams, indicated at 132. The elongated beams 132 provide the means by which the carriages 120 and 122 are moved by the entirety. The elongated beams 132 are mounted with the structure of an airframe either longitudinally or transversely, depending upon whichever direction the entire carriage apparatus is desired to be moved. In order to shift position of the entire carriage apparatus, a connecting beam 134 is provided which is attached to the mounting blocks 130 and on one end thereof and a pair of additional elongated beams 136 connect the four mounting blocks 130 so they are moved as a total connected structure.

In order to accomplish movement of the mounting blocks 130, an operator member 138 is connected to same to be moved by an operator which is not shown in the drawings. As shown in FIG. 6, it is to be noted that movement of the upper carriage is done through the use of control rods 140 and mounting blocks joining the guide bar apparatus 142 on the upper carriage 120. The use of control rods is shown in conjunction with this preferred specific embodiment of there herein described invention as one device to operate the apparatus of this invention. It is to be understood that any number of different specific control devices can be designed to move the carriages and other apparatus of this invention, and the devices disclosed herein are intended to illustrate the invention. The control rods 140 can be operated by either hydraulic, electrical, or mechanical servo-like devices in order to change position of the upper carriage and lower carriage relative to the mounting blocks 130. The position of the mounting blocks 130 on the elongated airframe structural beams 132 is an important feature of this preferred specific embodiment. The motion of the mounting blocks 130 can be accomplished through either hydraulic, electrical, or other mechanical servo-like means which are similar to means used to move the carriages. The significance of being able to move the entire carriage apparatus is that this allows for changing the overall position of the rotor blade apparatus in order to compensate for overall loading condition changes, thus enlarging the allowable center of gravity range in which the rotorcraft will operate. The overall effect of enlarging the allowable center of gravity range is to increase the capability of any rotorcraft using the invention.

Figure 7:
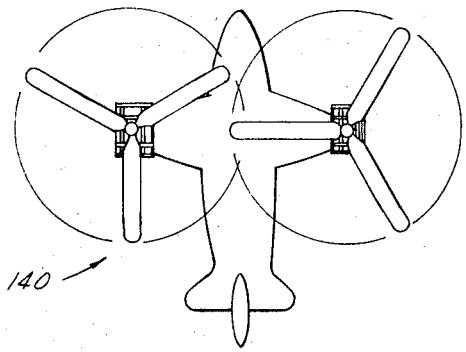
FIG. 7 is a top plan view of a rotorcraft structure having a pair of rotor blades in a side-by-side configuration utilizing the control system of this invention.
Figure 8:
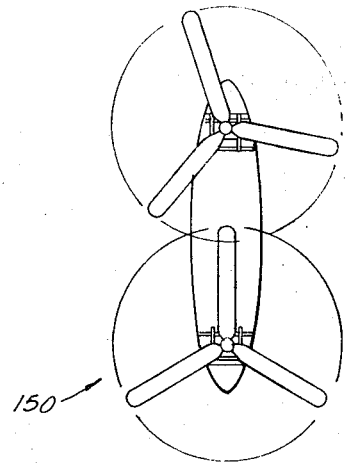
FIG. 8 is a top plan view of a rotorcarft structure having two rotors in a fore-and-aft configuration utilizing the control apparatus of this invention.

FIGS. 7 and 8 show two rotorcraft configurations using multiple rotor configurations on which the control means of this invention is shown. In the side-by-side dual rotor configuration 140 as shown in FIG. 7, the rotors can each be provided with a pair of carriages and overall carriage moving apparatuses that can be connected so as to be moved uniformly thereby controlling motion of the rotorcraft. Likewise, in the forward and aft rotor configuration rotorcraaft 150 as shown in FIG. 8, each rotor can be provided with a pair of carriages and overall carriage moving apparatuses which can be moved to control motion of the rotorcraft. In both of the dual rotor configurations shown, 140 and 150, the combined movements of the carriages is used to ontrol motion of the aircraft.

In practice of the herein described invention it has been found that use of the fixed pitch apparatus 16 and the cable control apparatus 44 in combination with an internal combustion engine will provode means sufficient to operate the control system of this invention during the flight of a rotorcraft. In such practice the speed of the engine 24 is directly used to control the speed of the blade apparatus 16 whereby controlling the lift of same during the flight of the rotorcraft. The cable control apparatus 44 provides sufficient capability to move the rotor head 18 and fixed pitch blade apparatus 16 correctly to control the rotorcraft's motion. However, it is to be noted that other types of power plants including turbines and the like can be used to power the rotorcraft, and other blade apparatuses can be used which have controllable or variable pitch blades, and other adaptations of the cable control apparatus can be used in order to move the carriages in their controlling motions. In general, in order to control forward and aft motion of the rotorcraft the upper carriage is moved longitudinally forward or aft relative to the airframe. With forward motion of the upper carriage the rotor head and blade apparatuses move forward relative to the center of gravitY of the rotorcraft; this causes forward motion of the rotorcraft. Similarly, rearward motion of the upper carriage 40 causes motion of the rotor head and blade apparatuses rearward relative to the center of gravity of the rotorcraft and thus causes rearward motion of the rotorcraft. Transverse motions of the rotorcraft are controlled by moving the transversely movable carriage 34 in side to side motion relative to the center of gravity of the rotorcraft. As the first carriage 34 is moved to one side or the other, it moves transversely relative to the center of gravity of the rotorcraft and thus causes a sideways motion of the rotorcraft when in flight. Additionally, when in flight the tail rotor apparatus 18 on the rotorcraft provides a means for stabilizing the torque reactions of the rotorcraft associated with the motions of flight; for this reason it is necessarily controlled independently of the herein described control system.

In the manufacture of the rotorcraft control means structure of this invention, it is obvious that the structure of the control apparatus can be constructed easily by the methods and techniques presently used to on-struct control apparatuses for rotorcrafts and utilize a lesser number of components and work involved in making same than the conventional and popular cyclic and pitch controllable rotorcraft control systems. The manufacture of the structure of this invention can be accomplished simply as is shown in the drawings in order to achieve the end product.

In the use and operation of the rotorcraft control means structure of this invention, it is seen that same provides a simple and effective means by which the rotor head assembly and blade assembly can be moved on and relative to an airframe structure of a rotorcraft in order to control the flight motions thereof. The motions of the carriages on which the rotor head and blade assemblies are mounted is used to control operation of the rotorcraft, and it is seen that the motions of these carriages is accomplishable by the use of a cable control apparatus and that operation of the rotor blade is accomplishable by the use of an internal combustion engine and an extendable and movable pivotable drive shaft connected to a blade apparatus gear box mounted on the edges.

As will become apparent from the foregoing description of the applicant's rotorcraft control means structure, relatively inexpensive and simply operating means have been provided to control the position of the rotor blade and associated driving apparatuses position on a rotorcraft airframe structure. The control means structure is simple in operation, has a minimum number of moving components, and is by its nature adapted to extend the versatility of the rotorcraft.

While the invention has been described in conjunction with preferred specific embodiments thereof, it will be understood that this description is intended to illustrate and not to limit the scope of the invention, which is defined by the following claims.

I claim:

1. An aircraft control means comprising:
   a. rotor head mounting means mountable with a frame means having means to move said rotor head mounting means transverse to said frame means, and having means to move said rotor head mounting means longitudinal to said helicopter frame means,
   b. blade rotating means secured to said rotor head mounting means and having a blade means,
   c. said rotor head mounting means has a first carriage means translatably mounted with said frame means to move transversely, and a second carriage means translatably mounted with said first carriage means to move longitudinally relative said first carriage means and having a portion of said blade rotating means mounted thereon,
   d. said means to move said rotor head mounting means operable to move said first carriage means and said second carriage means simultaneously relative to each other and relative to said frame means, and
   e. said means to move said rotor head mounting means having longitudinal beams and transverse beams having carriage blocks slidable mounted on said beams and movement of said carriage blocks moves said rotor head mounting means to move the center of gravity of said frame means,
   f. said means to move said rotor head mounting means transverse said frame means has a transverse way means mounted transverse said frame means and said first carriage means slidably mounted therewith, and
   g. said means to move said rotor head mounting means longitudinal to said frame means has a longitudinal way means mounted longitudinal said frame means and said second carriage means slidably mounted with said longitudinal way means, said control means is adapted to move said blade rotating means relative to said frame means so as to control a position of lifting forces on said frame means.

2. The control means as described in claim 1, wherein:
   a. said transverse way means has a pair of said parallel transverse beams secured transverse on said frame,
   b. said first carriage means has a pair of parallel passageways therethrough to engage said transverse beams so as to mount said first carriage for transverse movement thereof relative said frqme means,
   c. said longitudinal way means has a pair of said parallel longitudinal beams secured in a longitudinal position on said first carriage means, and
   d. said second carriage means has a pair of parallel passageways therethrough to engage said longitudinal beams so as to mount said second carriage for longitudinal movement thereof relative said first carraige means,
   e. said means to move said rotor head mounting means longitudinally has a guide frame means secured to said second carraige means,
   f. said means to move said rotor head mounting longitudinal and transversely has a carriage controls means connected to said guide frame means to move said second carriage means and said first carriage means forward and aft, and back and forth relative said frame means,
   g. said carriage control means has a cable control means having one pair of control cables connected to said guide frame means to move said first carriage means transversely, and another pair of control cables connected to said guide frame means to move said first carriage means longitudinally relative said frame means, and
   h. said cables are connected to a pilot control means for movement of said first and second carriage means in a horizontal plane.

3. In an aircraft having a frame means and powering means having a control means:
   a. a rotor mounting means mountable with said frame means having means to move said rotor head mounting means transverse to said frame means, and having means to move said rotor head mounting means longitudinal to said helicopter frame means, and
   b. blade rotating means secured to said rotor head mounting means having a blade means,
   c. said rotor head mounting means has a first carriage means translatably mounted with said frame means to move transversely, and a second carriage means translatably mounted with said first carriage means to move longitudinally relative said first carriage means and having a portion of said blade rotating means mounted thereon, and
   d. said means to move said rotor head mounting means including pairs of parallel transverse and longitudinal beams having carriage blocks thereon to move said carriage means and said second carriage means simultaneously relative to each other and relative to said aircraft frame means,
   e. a cable means having cable members connected to respective ones of said carriage blocks to move said first carriage means and said second carriage means on respective one of said transverse beams and said longitudinal beams,
   f. said powering means is operably connected to said blade rotating means by a transmission means, said control means is adapted to move said blade rotating means relative to said aircraft frame means to control the flying motion of said aircraft.

* * * * *